United States Patent [19]

Brown et al.

[11] 3,715,489

[45] Feb. 6, 1973

[54] APPARATUS FOR PREVENTING BUFFER OVERFLOW IN VIDEO ENCODING SYSTEMS BY INCREASING THE SCANNING RATE OF A CAMERA DURING THE TIME INTERVAL OF THE ENCODING OF DIGITAL WORDS OF EXTRA LENGTH

[75] Inventors: Earl Franklin Brown, Piscataway; William Kaminski, West Portal, both of N.J.

[73] Assignee: Bell Telephone Laboratories, Incorporated, Murray Hill, N.J.

[22] Filed: Feb. 23, 1971

[21] Appl. No.: 118,145

[52] U.S. Cl...................178/7.1, 178/DIG. 3, 178/6.8

[51] Int. Cl...............................................H04n 7/12

[58] Field of Search....................178/DIG. 3, 7.1, 6.8

[56] References Cited

UNITED STATES PATENTS

| | | | |
|---|---|---|---|
| 3,286,026 | 11/1966 | Greutmani et al. | 178/DIG. 3 |
| 3,299,204 | 1/1967 | Cherry et al. | 178/DIG. 3 |
| 3,339,017 | 8/1967 | Quinlan | 178/6.8 |

*Primary Examiner*—Robert L. Griffin
*Assistant Examiner*—Donald E. Stout
*Attorney*—R. J. Guenther and E. W. Adams, Jr.

[57] ABSTRACT

To prevent buffer overflow from line-to-line accumulation of information in video encoding systems, a detector circuit notes the occurrence of extra words or extra digits produced by a variable word length encoder. In response to this detection, a voltage adding means incrementally alters the slope of the horizontal sweep sawtooth which, in turn, results in a temporary increase in camera scanning speed. Logic means insures that the time obtained from the active scanning region by increasing scanning speed is allocated to the blanking interval.

8 Claims, 5 Drawing Figures

INVENTORS E. F. BROWN
W. KAMINSKI
BY Daniel D. Dubosky
ATTORNEY

APPARATUS FOR PREVENTING BUFFER OVERFLOW IN VIDEO ENCODING SYSTEMS BY INCREASING THE SCANNING RATE OF A CAMERA DURING THE TIME INTERVAL OF THE ENCODING OF DIGITAL WORDS OF EXTRA LENGTH

BACKGROUND OF THE INVENTION

This invention relates to video encoding systems. More particularly, it relates to methods and apparatus for improving the operation of video encoding systems that utilize buffer memories.

In developing the standard format of video signals, television cameras operate by scanning the field of vision in the horizontal direction a large number of times during each predetermined frame interval. Each horizontal scan of the field of view is defined as a horizontal line. Since the scanning operation requires a certain amount of time to return to the beginning of a subsequent line from the end of a prior line, blanking intervals are inserted between the active scanning intervals.

A variety of methods have been developed for reducing redundancy in transmitted video signals. The most recent and most promising of these have utilized the effects of digital encoding techniques. Typically, these systems utilize a division of the scanned lines into a large number of samples. The samples are in turn converted to digital information. Under certain circumstances, such as rapid motion or large brightness differentials, the digital encoders may produce more digital information than can be transmitted prior to the encoding of a subsequent line. The inevitable result of producing this excess is the loss of a certain amount of information, with the corresponding degradation of picture quality at the receiver.

At least two prior art techniques have attempted to solve video line-to-line overflow problems. The first of these techniques uses a double scan, the first scan detecting the degree of sample-to-sample change in a line and the second performing the actual active scan. The rate of the second scan is conducted at a rate inversely proportional to the amount of change detected by the first scan. Thus, this approach prevents line-to-line overflow by actually slowing the rate at which information is conveyed to the buffer during times of potential overflow. This technique, while being quite sound in theory, has proven relatively unsuccessful in practical applications.

The second prior art method for alleviating overflow problems involves cropping the size of the picture to be transmitted. That is, when an overflow condition is observed, the amount of the field of view scanned by the cameras is actually attenuated. This results in the conveyance of a reduced amount of information to the buffer, thereby allowing the overflow condition to be reduced. This also results, however, in a smaller picture of reduced information content which is surrounded by a "picture frame" corresponding to the deleted portion of the field. The subjective discomfort and loss of information of this method often renders it unsatisfactory.

SUMMARY OF THE INVENTION

The present invention provides a method for regulating the amount of digital information into which a line of a video frame is encoded, so that excess accumulation of information in the transmitter buffer is prevented. In this manner, line-to-line spillover of information is eliminated.

Embodiments of the present invention accomplish this regulation of production of digital information by dynamically increasing the rate of scan in response to a condition equivalent to impending buffer overflow. In accordance with the principles of the present invention, scanning of each line is initiated at fixed intervals, but control of the blanking period allows the active portion of the line to be dynamically shortened. In response to extra digits or extra words (depending on the coder used) being detected either in the buffer or from a variable length encoder, the rate of scanning during the active portion of a line is dynamically increased for a short period of time. The amount of time gained in the line by the increased scanning rate is allocated to the blanking period.

Thus, in accordance with the principles of the present invention, the existence of more digital information than can be handled by the transmitting buffer signals a three-fold adjustment: the time required for the active scan is reduced, the amount of information conveyed to the coder is kept at a relatively constant level, and the amount of time available for the buffer to empty (i.e., the blanking interval) is increased.

In a preferred embodiment of the present invention a television camera scans the field of vision with a fixed line period, and conveys the signal through a low-pass filtering means to a sampler and then to a variable word length digital encoder. The encoder in turn transmits digital versions of the sampled video signal to the transmission buffer; as this happens, a logic detector notes the occurrence of samples which are encoded with extra digits and thereby detects a condition of impending buffer overflow. When the detector notes an extra code digit or word, it transmits pulses to a voltage adder which causes an incremental increase in the slope of a horizontal sawtooth signal. Since the horizontal sawtooth signal directly controls the rate of scan, the adder operation tends to increase the rate at which the camera scan proceeds. Consequently, the amount of scanning time for the instant line is proportionately reduced, while the increase in scanning rate allows a relatively constant amount of video information to be conveyed to the coder. Additional apparatus, including a frequency multiplier, a counter and various logical circuitry insures that this extra time is applied to the blanking period and that the blanking period ends before commencement of scanning a new line.

The principles of the present invention are quite workable with other encoder embodiments as well. For example, in certain encoding systems utilizing uniform word length coders, transmission constraints such as multiplexing bring about the need for use of a buffer-type output and, furthermore, might occasionally create a buffer overflow problem. In such cases, embodiments of the present invention would include a detector which directly monitors the storage condition of the buffer. In response to an approaching overflow situation, this detector would activate apparatus similar to the feedback apparatus of the preferred embodiment to perform the desired shortening of the active interval, lengthening of the blanking interval, and prevention from encoding one or more subsequent samples.

It is a feature of the present invention that line-to-line spillover of video information, with its consequent loss of information, is eliminated. Another feature is that line-to-line spillover is reduced without affecting the size of the transmitted picture. Moreover, spillover reduction is accomplished with negligible degradation in the quality of the picture.

DETAILED DESCRIPTION

Figure 1:
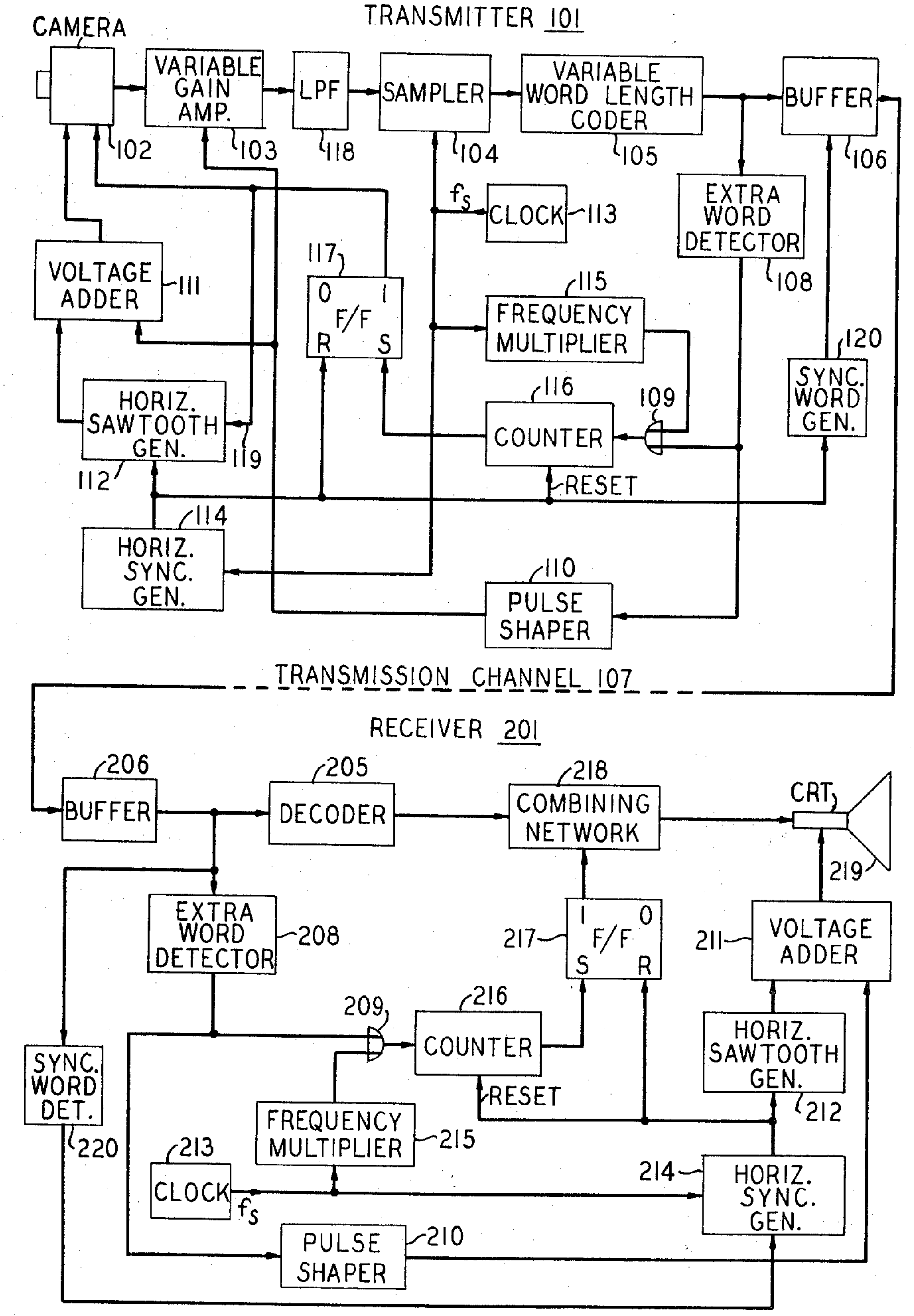
FIG. 1 shows a schematic block diagram of a preferred embodiment of the present invention.

In particular, FIG. 1 shows a complete system including a transmitter 101 and a receiver 201, both of which embody the principles of the present invention. It should be stressed, however, that the principles of the present invention may be applied independently either to the transmitter or to the receiver.

The embodiment of FIG. 1 applies the principles of the present invention to video systems which utilize variable word length encoders. One example of such a coder is described in U. S. patent application, Ser. No. 632,304, of E. F. Brown, entitled, "Sliding Scale Predictive Coding Systems." Hereinafter, any reference to a variable word length coder will be to this type of coder.

The Brown sliding scale coder features a dual mode operation; in the first mode samples are encoded as three-digit binary words and in the second mode samples are encoded as six-digit binary words. An amplitude range is chosen in which the samples are most likely to occur; in this range, the normal three-digit mode is utilized. If the sample to be encoded is detected as having an amplitude outside the designated range, the encoder is shifted into its six-digit second encoding mode. That is, if a sample is encoded in the three-digit mode as code words 000 or 111 (which correspond to the extremes of the designated amplitude range), the apparatus within the encoder causes the portion of the sample outside the range to be recycled through the coder and thereby undergo an extra three-digit encoding procedure. The net effect of the recycling is a six-digit per sample encoding procedure which effectively doubles the available-for-encoding amplitude range for that particular sample.

In FIG. 1, the transmitter 101 will be described first, with a description of the receiver following. Video signals are generated by a camera 102 and conveyed to a variable gain amplifier 103. The amplified video signal is filtered by a low pass filter 118, sampled by a sampler 104 and conveyed for encoding to a variable word length coder 105. The digital output of the coder 105 is conveyed to a buffer 106 which, in turn, applies them to a transmission channel 107.

An extra word detector 108 continuously senses the output signals from the coder 105, producing output signals whenever it detects the existence of a longer-than-normal coded word. The output from the detector 108 is applied to an OR gate 109, as well as to a pulse shaper 110. Pulses from the shaper 110 are coupled to a voltage adder 111 and are utilized to control the gain of the aforementioned amplifier 103. The adder 111 serves to combine the amplitude of the sawtooth signals from a horizontal sawtooth generator 112 with those from shaper 110, and uses the combined waveform to control the scanning rate of the camera 102.

A clock 113, operating at a rate $f_s$, controls the sampler 104 and a horizontal sync generator 114. Moreover, the clock pulses are passed through a frequency multiplier 115 to the OR gate 109. A counter 116 has its output connected to the "set" input of a flip-flop 117. The horizontal sync generator 114 is connected to the "reset" terminal of the flip-flop 117 and to an enabling input of the sawtooth generator 112. The "1" output of the flip-flop 117 controls the initiation and termination of the blanking periods between scanned lines in the camera 102. A sync word generator 120 responsive to the horizontal sync generator 114 inserts appropriate synchronizing information during each blanking interval to facilitate proper receiver 201 operation.

The operation of the transmitter 101 may be conveniently divided into three separate functions. The first is the basic scanning, sampling, and encoding operation. The second is the variation of the scanning rate of the camera during the active portion of the line, and the third is the allocation of extra time to the blanking period. These three functions will be discussed seriatim.

The camera 102 is a standard television camera, which operates by scanning the field of view a line at a time. Thus, the representation of the video image provided by the camera 102 is an analog signal, the amplitude of which corresponds to the relative brightness levels across the scanned line. Of course, blanking periods are inserted between the lines in order to account for "flyback" of the scanning beam from the end of one line to the beginning of the next. The variable gain amplifier 103 serves merely to keep the analog signals from the cameras at a uniform relative amplitude level. That is, in response to signals from the pulse shaper 110, the gain of amplifier 103 is adjusted in accordance with the changed rate of the scanning signal. This change operates to eliminate any changes in brightness of the signal from the camera 102 due to scanning variations. That is, when the scan is slower, residual charging in the camera 102 may result in unwanted increases in brightness level; amplifier 103 tends to negate this effect.

Like the variable gain amplifier 103, the low-pass filter 118 is included in the embodiment of FIG. 1 to make certain compensations for the increased scanning rates produced in the camera 102. During the short time period (of at least two sampling periods, as will be detailed hereinafter) in which the camera scan speed is increased, certain high-frequency signal components are naturally developed. Since these components are unnecessary and in fact unwanted, the low-pass filter 118 is included to eliminate unwanted high-frequency components prior to the sampling and encoding of the scanned video signal.

A signal of uniform relative amplitude level is thus delivered to the sampler 104. The sampler 104 operates at a rate $f_s$, under the control of the clock 113, conveying samples to the variable word length coder 105 whenever it receives a pulse from clock 113. The coder 105, operating as aforementioned, delivers code words to the buffer 106 at the rate $f_s$. Since occurrence of a six-digit word is signalled by the code words 000 or 111, the extra word detector 108 is embodied merely as a simple logic circuit which is responsive to these words. For example, the extra word detector 108 may be embodied as a plurality of gates which are activated only by those particular code combinations. When a six-digit word is noted, detector 108 produces a succession of three output pulses.

In summary, the encoding process includes camera scanning, gain adjustment, and sampling prior to the variable word length encoding. The buffer transmits the variable length words to the transmission channel and to detector 108 which controls the feedback circuitry of the transmitter 101 by producing three pulses in response to each long word condition.

The variation of the scanning rate of the camera proceeds as follows. The pulse shaper 110 produces, upon the occurrence of a long word from the coder 105, a single "ramp type"pulse (the specification of which shall be described hereinafter) which it delivers to amplifier 103 and to the voltage adder 111. The principle function of the voltage adder 111 is to cause the camera line scan to be completed in a time which is shorter than the normal scan provided by the horizontal sawtooth generator 112. Accordingly, in the absence of signals from pulse shaper 110, adder 111 passes the sawtooth control signal from the generator 112 directly to the camera 102 such that a ramp of the sawtooth signal has a duration equal to the desired duration of a line scanned at normal rates. When a pulse is received from the shaper 110, indicating presence of an extra word, the amplitude of the pulse is combined by adder 111 with the sawtooth voltage. Due to the ramp-type shape of the pulse from shaper 110, this results in an increased slope on the signal conveyed from adder 111 to camera 102 for the duration of the pulse from shaper 110. When the pulse from the shaper 110 is terminated, the signal conveyed to the camera 102 has the normal slope of the sawtooth generator. These increases in the slope of the horizontal sawtooth control signal bring about an increase in the scanning velocity of the line. As will be described in detail hereinafter, the active scan is terminated and the blanking period is initiated when flip-flop 117 is "set." At this time, via line 119 the flip-flop 117 causes sawtooth generator 112 to terminate the upward ramp of the sawtooth. Thus, a pulse from shaper 110 to adder 111 causes the line scan velocity to be increased, thereby allowing for an increase in the next blanking interval.

Finally, as previously described, pulses from the shaper 110 cause variable gain amplifier 103 to change its gain, thereby compensating for changes in relative brightness level due to different scanning velocities of the camera.

The pulse shaper 110 may be embodied as a generator which produces a pulse signal in accordance with the following requirements: First, the overall pulse shape should be that of a ramp to allow for a smooth combination in adder 111 with the sawtooth signal. Moreover, the slope of the ramp is dependent on the desired amount of increase in the camera scanning velocity. A preferred ramp slope is one which results in twice the horizontal sawtooth slope. Secondly, the duration of the ramp should be approximately one clock period long beginning at about one-half of a clock period after the sample which resulted in the longer six-digit word and ending at about one-half of a clock period after the next sample. In other words, the ramp should bracket or be centered upon the sample following the six-digit sample. As a result, with the resulting increased slope at twice the normal slope, a single sample will be taken in a spatial interval (following the six-digit sample) which would normally have been sampled twice.

Figure 2A:
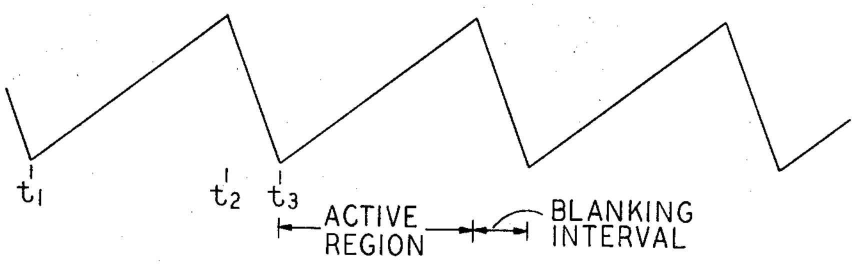
FIGS. 2A, 2B, 2C, and 2D show waveforms associated with the embodiment of FIG. 1.
Figure 2B:

This scan velocity changing operation may be more clearly understood by consulting the voltage waveforms of FIGS. 2A through 2D. FIG. 2A shows the normal horizontal sawtooth signal delivered to the camera 102 from the adder 111, and FIG. 2B shows a corresponding video signal produced by the camera 102. The sawtooth of FIG. 2A is periodic, each period is being divided into an active region and a blanking interval. The active region corresponds to the upward sloped positions, as between times $t_1$ and $t_2$. The blanking regions correspond to the downward sloped portions, as between $t_2$ and $t_3$. A comparison of FIGS. 2A and 2B clearly shows the correspondence of the upward slope of the sawtooth to the analog signal (i.e., the active region), as well as of the downward segment to the negative pulse (i.e., blanking interval).

Figure 2C:
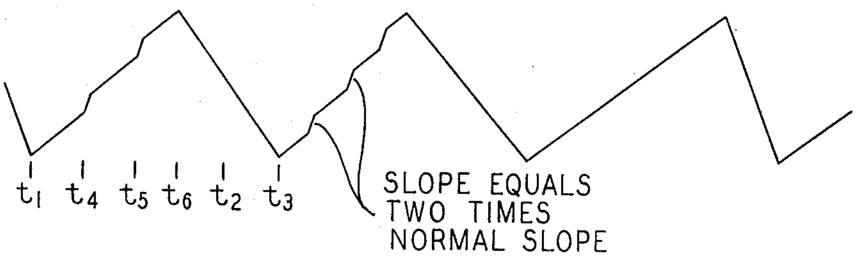
Figure 2D:

FIGS. 2C and 2D show signals which correspond respectively to FIGS. 2A and 2B. The waveforms of FIGS. 2C and 2D, however, represent horizontal sweep and video signals which have been produced in accordance with principles of the present invention. For comparison with FIGS. 2A and 2B, times $t_1$, $t_2$, and $t_3$ are also designated on FIG. 2C. In the wave form of FIG. 2C, the upward slopes at times $t_4$ and $t_5$ correspond to occurrences of extra words, and therefore signals from pulse shaper 110 to amplifier 111. These slope changes bring about increases in the camera scan velocity, thereby enabling the line to be scanned more quickly. At time $t_6$, the flip-flop 117 is set, and the change of state on line 119 causes the sawtooth generator 112 to terminate its upward sloped portion. The downward sloped portion of the sawtooth is thereby extended in duration by an amount equal to the difference between times $t_6$ and $t_2$. FIG. 2D clearly shows how this transferral of time changes the length of the blanking period with respect to the analog signal bearing active region.

The remainder of the apparatus of transmitter 101 is dedicated to the function of allocating to the blanking interval the time accrued by reducing the active region. For the sake of clarity, it is appropriate to first describe the apparatus as it operates when no extra words are noted by detector 108 and subsequently to show its operation upon the occurrence of extra words. A frequency multiplier 115 produces a pulse signal whose pulses occur at some multiple of $f_s$, the sampling frequency of clock 113. For the aforementioned sliding scale predicative coders of E. F. Brown, frequency multiplier 115 produces three output pulses upon the occurrence of each clock 113 pulse. The reason for this multiplication by three is that the standard word length from the coder 105 is three digits per sample word. The pulse signal from the multiplier 115 is applied through an OR gate 109 to a counter 116. The function of counter 116 is to set flip-flop 117 whenever it (the counter) has counted to a predetermined number equal to the total number of digits produced per encoded line. For example, if camera 102 scans 200 picture elements per line and coder 105 encodes each picture element as three digits, counter 116 sets flip-flop 117 upon reaching the count of 600. Accordingly, the setting of the flip-flop 117 by the counter 116 causes generator 112 to terminate its active scan and causes camera 102 to commence its blanking interval.

In addition, the horizontal sync generator 114, under the control of sampling pulses from clock 113, subsequently controls the initiation of active portions of scanned lines, and is connected to the counter 116, the generator 112 and the reset terminal of flip-flop 117. Accordingly, at fixed periods of time (corresponding to times $t_1$, $t_3$, etc., of FIG. 2A) the horizontal sync generator 114 pulses the reset terminal of flip-flop 117 as well as the sawtooth generator 112. The resetting of counter 116 causes it to return to zero and commence counting. The pulsing of the reset terminal of flip-flop 117 allows camera 102 and sawtooth generator 112 to commence the operation of scanning another picture line. Hence, the connection of generator 114 to generator 112, flip-flop 117 and counter 116 synchronizes the operation of the counter 116 and flip-flop 117 with the horizontal sawtooth signal.

The pulses from the horizontal sync generator 114 which reset the counter 116 are also coupled to the sync word generator 120. Upon receiving these pulses, the sync word generator 120 transmits to the buffer 106 a "flag word" which, in effect, marks the transition times between lines. The purpose of these "flags" is to provide synchronizing information for the receiver 201, so that the reconstruction of the video signals performed therein will occur synchronously with the encoding in the transmitter 101.

Thus, in the absence of a longer code word from coder 105, the horizontal sync generator 114 causes flip-flop 117 to activate the scanning of a new line by camera 102. The counter 116 in turn causes flip-flop 117 to terminate the active scanning of a line and commence the blanking interval whenever it (counter 116) reaches its predetermined count. The operation is very similar when coder 105 produces words of extra length. Since the coder 105 is specified as producing six-digit extra length words, detector 108 produces three pulses whenever it notes the occurrence of extra length words. These pulses are applied by OR gate 109 to the input of counter 116. Thus, the production of a "long word" by coder 105 causes counter 116 to advance its count by three. As a result, the counter 116 sets flip-flop 117 at a correspondingly early time, thereby initiating the blanking period proportionately sooner.

In summary, pulses from detector 108 and multiplier 115 drive counter 116, which in turn sets flip-flop 117 when it reaches a predetermined count. This corresponds to the termination of the active scan and the initiation of the blanking interval. Sync generator 114 periodically resets counter 116 and flip-flop 117, terminating the blanking and initiating a new active scan.

The foregoing discussion has shown how transmitter 101, upon the occurrence of a longer word from coder 105, decreases the active scanning time of a line and assigns the extra time accrued thereby to the blanking interval. The operation of receiver 201 is exactly the same as this operation. That is, receiver 201 normally operates with a scanning rate equivalent to that shown in FIGS. 2A and 2B. Upon delivery of a "long word" from transmission channel 107 to the input buffer 206, the receiver shortens the active scan and lengthens the blanking interval in the same manner as in the transmitter 101.

Receiver 201 includes a decoder 205, an extra word detector 208, an OR gate 209, a frequency multiplier 215, a counter 216, a flip-flop 217, a clock 213, a horizontal sync generator 214, a horizontal sawtooth generator 212, a pulse shaper 210, and a voltage adder 211. Each of these components is identical in structure and in function to the corresponding parts in transmitter 101. In addition, the receiver 201 includes a combination network circuit 218, a sync word detector 220, and a cathode ray tube (CRT) output 219.

At the outset, synchronizing flag signals are extracted from the video portion of the signal by a sync word detector 220. The detector 220 then energizes the horizontal sync generator 214; the operation of the receiver 201 thus proceeds in synchronism with the video data conveyed from transmitter 101.

The operation of the receiver is practically identical to that of the transmitter 101. The only real difference (other than replacing the camera 102 with the CRT 219) is the addition of the combination network 218, and its only function is to combine the decoded active region from decoder 205 with the blanking period from flip-flop 217. Accordingly, combination network circuit 218 is embodied as simply as a resistive "tee" network. Otherwise, the description of the transmitter 101 applies with equal force to the apparatus of the receiver 201.

It is worthy of mention that the principles of the present invention may be readily applied by those skilled in the art to video systems using variable word length coders other than the coder of E. F. Brown described in the embodiment of FIG. 1. Conveniently, the Brown coder converted extra large samples into digital words, the extra length of which is exactly equal to the number of digits in a standard length code word. Thus, to apply the principles of the present invention to a video system utilizing the Brown coder, the speeding up of the camera scan effectively involved the omission of one spatial sampling from the active portion of the line. It is conceivable, however, that a coder would convert larger signal samples with a number of extra digits less than the standard word length of a single encoded sample. To apply the principles of the present invention to a system utilizing that type of coder, it would merely be necessary to alter the specification of the ramp-shaped pulses produced by the pulse shaper 110 of FIG. 1. That is, since the pulses from shaper 110 directly control the degree of change in the camera scan speed, a changed duration of slope of the signal from shaper 110 would result in a different degree of change of scan speed. Consequently, the shaper may be readily adjusted to cause the camera scan speed to be increased to correspond to a fraction of spatial sampling.

The foregoing embodiment is intended to be illustrative of the basic principles of the present invention, but is in no way intended to limit the spirit or scope of the invention. Other embodiments may readily occur to those skilled in the art without departing from the spirit of the present invention.

What is claimed is:

1. In a video system for transmitting information encoded in frame intervals which are subdivided into lines, each line comprising an active interval and a blanking interval, encoding apparatus comprising:

means for generating a video signal by scanning a video image, a line at a time, initiation of scanning a new line occurring at fixed intervals;

means for sampling the video signal;

means for digitally encoding the video samples;

buffer means for storing the encoding samples prior to transmission;

means for detecting a condition of impending buffer overflow; and means for controlling the rate of scanning in said means for generating a video signal in response to said detecting means, whereby the amount of information produced per line is kept relatively constant, the active interval of a line is shortened and the blanking interval of the line is lengthened in response to a condition of impending buffer overflow.

2. Encoding apparatus as described in claim 1 wherein said means for controlling the rate of scanning comprises:

means for generating sweep signals;

means responsive to said detecting means for incrementally varying the instantaneous rate of amplitude change of signals from said sweep generating means; and means responsive to said detecting means for commencing the blanking interval.

3. Encoding apparatus as described in claim 2 wherein said means for incrementally varying the instantaneous rate comprises:

means responsive to said detecting means for producing a pulse each time said detecting means indicates a condition of impending buffer overflow, and means for combining said pulse with the signals from said sweep generating means.

4. Encoding apparatus as described in claim 2 wherein said means for commencing the blanking interval comprises:

bistable means for commencing the blanking interval upon the occurrence of a first signal pulse and for terminating the blanking interval upon receiving a second signal pulse;

counting means responsive to said detecting means for producing said first signal pulse upon reaching a predetermined count; and means cooperative with said sweep generating means for periodically producing said second signal pulse.

5. Encoding apparatus as described in claim 1 wherein said encoding means comprises means for digitally encoding the video samples in a first or a second encoding mode, depending upon the amplitude of signals to be encoded.

6. Encoding apparatus as described in claim 5 wherein said means for detecting a condition of impending buffer overflow comprises:

means responsive to said encoding means for producing signals upon the operation of said encoding means in said second encoding mode.

7. Encoding apparatus as described in claim 1 wherein said means for detecting a condition of impending buffer overflow includes means for detecting a situation in which the number of digits per line being produced by said means for digitally encoding is in excess of the number of digits which can be transmitted from said buffer means in an equivalent time, and said means for controlling includes means for changing the rate of scanning of said means for generating a video signal for a time duration proportional to the number of digits being produced per line in excess of the number which can be transmitted from said buffer means.

8. In a video system for transmitting information encoded in frame intervals which are subdivided into lines, each line comprising an active interval and blanking interval, encoding apparatus comprising:

means for generating a video signal by scanning a video image, a line at a time, initiation of scanning new lines occurring at fixed intervals;

means for sampling the video signal at a fixed rate;

means for digitally encoding the video samples, each succeeding sample being encoded with a variable number of digits, said variable number being dependent on the degree of amplitude change from the immediately preceding sample; and means, responsive to a variation in the number of digits per sample produced by said means for digitally encoding for changing the scanning rate of said means for generating for a time duration proportional to the variation in the number of digits associated with each sample by said means for digitally encoding, whereby an increased number of digits per sample yields a decreased number of samples per line, with the overall amount of information produced per line being kept relatively constant.

* * * * *